(Model.)
G. F. BURKHARDT.
FILTER.
No. 248,573.  Patented Oct. 25, 1881.
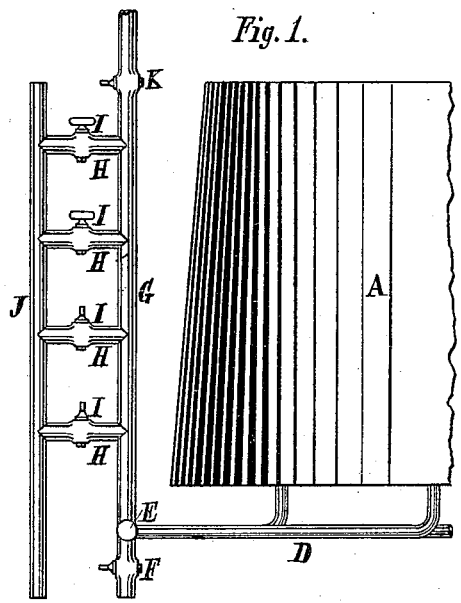
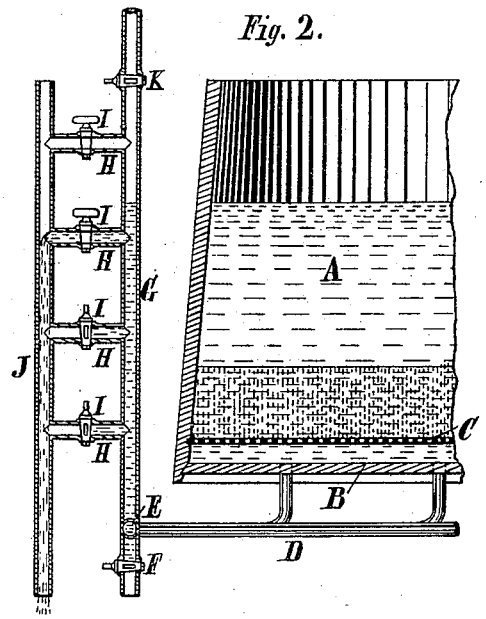
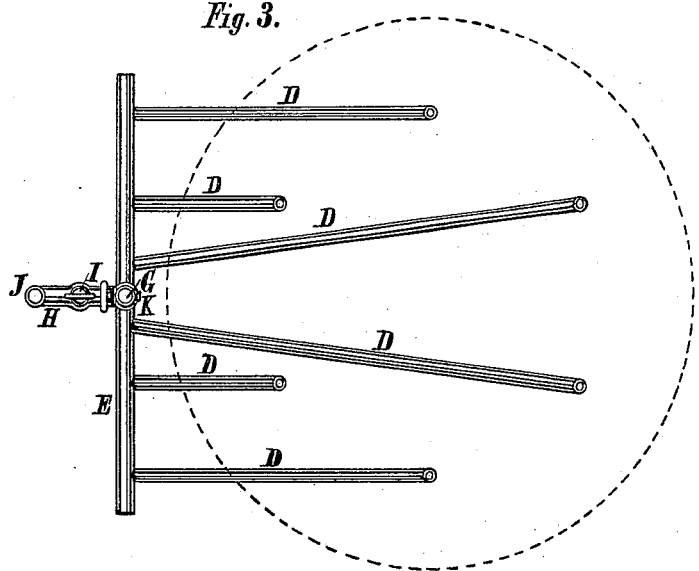
Attest;
Louis Cohen,
Joseph Selig,
Inventor;
Gottlieb F. Burkhardt,
per Edw. Dimmer,
Atty.

UNITED STATES PATENT OFFICE.

GOTTLIEB F. BÜRKHARDT, OF BOSTON, MASSACHUSETTS.

FILTER.

SPECIFICATION forming part of Letters Patent No. 248,573, dated October 25, 1881.

Application filed January 31, 1881. (Model.)

*To all whom it may concern:*

Be it known that I, GOTTLIEB F. BÜRKHARDT, a citizen of the United States, residing at Boston, in the county of Suffolk and State of Massachusetts, have invented a new and useful arrangement of pipes and faucets in combination with a mash-tub or other tank, of which the following is a specification, reference being had to the accompanying drawings.

My invention consists in an arrangement of pipes and faucets in combination with a mash-tub or other vessel or tank, whereby the liquid in said tub, vessel, or tank may be drawn off at or near the level of the top of said liquid in order that it may flow under slight pressure, and hence percolate slowly and evenly through the mash or other mixture to make the filtration most complete, and to prevent the strainer from being clogged.

In the drawings, Figure 1 is a side elevation of an apparatus embodying my invention. Fig. 2 is a vertical central section. Fig. 3 is a plan showing the pipes, the dotted line indicating the position of the tank.

The vessel A represents a mash-tub or other tank in which is the liquid and mash or other mixture through which the liquid is to be filtered. A short distance above the bottom B of the tank is a strainer, C. The liquid, after passing through the strainer, flows through the pipes D into the pipe E.

It has heretofore been customary to draw off the liquid at or below the bottom of the tank, as by means of a faucet at F. When this is done the liquid, being under considerable pressure, owing to the height of the same, will flow rapidly through the mash or other mixture, the result of which is an imperfect filtration and to clog the strainer.

I connect with the pipe E a vertical pipe, G. From this vertical pipe several pipes, H, lead off at different elevations. In each pipe H is a faucet, I. The pipes H lead into another vertical pipe, J, which is open at the bottom, or leads to wherever it is desirable to conduct the liquid. Whatever may be the height of the liquid in the tank, it will rise at the same height in the pipe G, the faucet F being closed. Then by opening the proper one of the faucets I the liquid may flow into the pipe J, and hence be conducted away from a point nearly or quite level with the top of the liquid in the tank. In this manner all the liquid may be drawn from the tank by opening the faucets I successively, and it will flow slowly, being under slight pressure, will be free from solid matter, the filtration being complete, and will not force the solid substance of the mash or mixture against and into the strainer to clog the same.

The faucet F may be opened when it is desirable to empty the pipes.

At the upper end of the pipe G is shown a faucet, K.

It is sometimes necessary to force water or other liquid into the tank A at the bottom, and this may be done by allowing the water to pass down the pipe G, the faucet K being open and the faucets I and F being closed. When the pipe G is not to be used for this purpose it need not extend upward farther than at a level with the top of the tank, and there would be no necessity for the faucet K.

I claim as my invention—

1. In combination with a mash-tub or other tank having a strainer therein, one or more vertical pipes leading from the bottom of the tank and having several orifices at different elevations, substantially as and for the purpose hereinbefore set forth.

2. The combination of the tank A, pipes D, pipe E, vertical pipe G, and pipes H, having faucets I, substantially as described.

3. The combination of the tank A, having strainer C, vertical pipe G, leading from the bottom of the tank and having the faucet K, and the pipes H, having faucets I, substantially as set forth.

4. The combination of tank A, vertical pipe G, connected with the bottom of the tank, horizontal pipes H, having faucets I, and the vertical pipe J, substantially as and for the purpose set forth.

GOTTLIEB F. BÜRKHARDT.

Witnesses:
EDW. DUMMER,
WM. H. DRURY.